(No Model.)
C. G. MOWER.
HARROW.
No. 356,150. Patented Jan. 18, 1887.
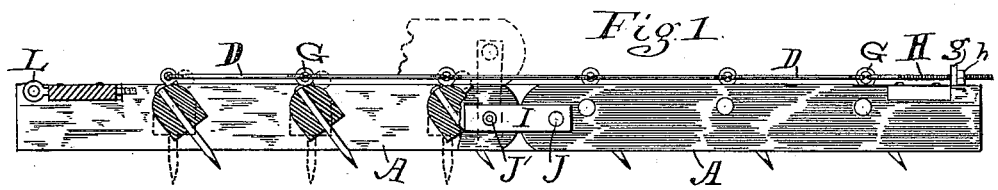
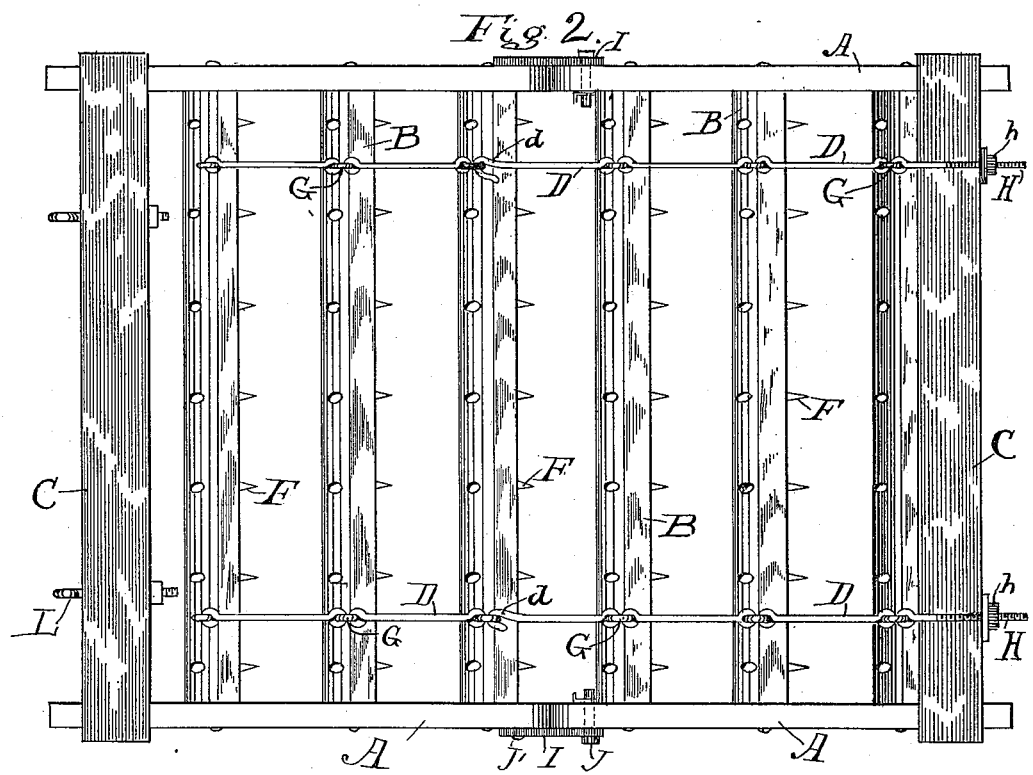
Witnesses:
Robert A. Davis,
Chas. E. Daily.
Inventor:
Charles G. Mower
by S. W. Bates
his Atty.

UNITED STATES PATENT OFFICE.

CHARLES G. MOWER, OF ST. ALBANS, MAINE.

HARROW.

SPECIFICATION forming part of Letters Patent No. 356,150, dated January 18, 1887.

Application filed September 23, 1886. Serial No. 214,313. (No model.)

*To all whom it may concern:*

Be it known that I, CHARLES G. MOWER, a citizen of the United States, residing at St. Albans, in the county of Somerset and State of Maine, have invented certain new and useful Improvements in Harrows; and I do hereby declare the following to be a full, clear, and exact description of the invention, such as will enable others skilled in the art to which it appertains to make and use the same.

My invention relates to harrows; and the object of my invention consists in providing a smoothing-harrow whose teeth can be adjustably inclined backward, so that the draft of the harrow can be regulated to conform to the character of the ground to be pulverized. I accomplish this object by means of a harrow having its teeth inserted in bars which are pivoted at each end to the sides of the frame. The harrow-teeth are set at any desired inclination by rotating the bars in which they are inserted, these bars being held in place by one or more chains passing over their tops and secured thereto, the ends of these chains being secured to screw-threaded rods which are held to the frame-work of the harrow by nuts. The harrow has a hinged joint in the center, by which it is turned upon itself and made more compact for transportation, &c.

My invention is fully illustrated in the accompanying drawings, in which—

Figure 1 represents a side elevation. Fig. 2 represents a plan or top view.

A A are side pieces of the frame, each side being made in two sections. These sections are hinged together by a metal plate, I, which is pivoted to the adjacent ends of the two sections by the pins J and J', the pin J being removable.

C C are cross-bars, and B B are tooth-bars, the ends of which are pivoted to the side bars of the frame. The teeth F are inserted in these bars.

G G are eyes secured to the bars D, and to these eyes are connected the links of the chains D D. The back end of each chain is secured to the screw-threaded rod H, which passes through the lip or stud $g$, and is provided on the back side of said lip with nut $h$.

The rods H may pass directly through the cross-bar C, the height of the latter being adjusted to this purpose.

L L are bolts by which the harrow is drawn.

The operation of my harrow is as follows, viz: When it is desired to use a harrow with vertical teeth, the nut $h$ is turned upon the rod H, drawing back this rod and rotating the entire series of bars B until the teeth are brought vertical. As the harrow is drawn along, the tension on the rods H causes the teeth to remain in position. So, also, when a smoothing-harrow is desired, the teeth are allowed to incline backward by unscrewing the nut $h$.

The harrow may be separated into two parts by unhooking the chains at $d$ and removing the pins J, or the sections may be turned over on each other, as shown in dotted lines in Fig. 1, thus making it more compact for transportation, &c.

I am aware that harrows have been made having rotating tooth-bars pivoted to the side bars, and having means for rotating such bars to change the inclination of the teeth. Tooth-bars have also been pivoted to the side bars, the tooth-bars being held in position by springs, which allowed the bars to rotate and the teeth to give way when they met an obstruction; but these constructions I do not claim.

I am also aware that it is not new to jam the several tooth-bars by means of hooked links.

I claim—

In a folding harrow, the combination, with a frame made of side pieces, A, and cross-bars C in two sections pivoted together at their adjacent ends, as described, of tooth-bars B, pivoted to the side bars and provided with the teeth F and eyes G, and the series of links D, connecting with said eyes, whereby said bars can be turned at will, the adjustable screw-threaded rods H, and nuts $h$, and the central links, each having a hook, $d$, whereby the two parts of the harrow can be united together or easily separated, all as and for the purposes described.

In testimony whereof I affix my signature in presence of two witnesses.

CHARLES G. MOWER.

Witnesses:
THOS. H. B. PIERCE,
H. G. PARESPLEY.